(12) United States Patent
Franz

(10) Patent No.: US 10,108,832 B2
(45) Date of Patent: Oct. 23, 2018

(54) AUGMENTED REALITY VISION BARCODE SCANNING SYSTEM AND METHOD

(71) Applicant: Hand Held Products, Inc., Fort Mill, SC (US)

(72) Inventor: Dwight Linwood Franz, Haddonfield, NJ (US)

(73) Assignee: Hand Held Products, Inc., Fort Mill, SC (US)

( * ) Notice: Subject to any disclaimer, the term of this patent is extended or adjusted under 35 U.S.C. 154(b) by 491 days.

(21) Appl. No.: 14/970,702

(22) Filed: Dec. 16, 2015

(65) Prior Publication Data
US 2016/0188943 A1    Jun. 30, 2016

Related U.S. Application Data

(60) Provisional application No. 62/098,150, filed on Dec. 30, 2014.

(51) Int. Cl.
*G02C 7/04*        (2006.01)
*G02B 27/01*       (2006.01)
(Continued)

(52) U.S. Cl.
CPC ..... *G06K 7/10841* (2013.01); *G02B 27/0172* (2013.01); *G02C 7/04* (2013.01);
(Continued)

(58) Field of Classification Search
CPC .............. G02B 27/017; G02B 27/0172; G02B 2027/014; G02B 2027/0178; G02B 2027/0138; G02B 1/043; G02B 26/12; G02B 27/0101; G02B 27/144; G02B 7/002; G02C 7/04
See application file for complete search history.

(56) References Cited

U.S. PATENT DOCUMENTS 5,682,210 A  * 10/1997  Weirich ............... G02B 27/017
                                                     345/32
6,353,422 B1 *  3/2002  Perlman ............... G02B 27/017
                                                     345/7
(Continued)

FOREIGN PATENT DOCUMENTS

WO       0025662 A1    5/2000
WO    2013163789 A1   11/2013
(Continued)

OTHER PUBLICATIONS https://www.selectspecs.com/blog/7-awesome-bionic-contact-lenses-of-the-future/ (Year: 2014).*
(Continued)

*Primary Examiner* — Florian M Zeender
*Assistant Examiner* — Dana Amsdell
(74) *Attorney, Agent, or Firm* — Additon, Higgins & Pendleton, P.A.

(57) ABSTRACT

An exemplary augmented reality vision barcode scanning system for use with a human visual system includes at least one scanning contact lens, wireless enabled companion eyewear, and a remote barcode decoder. A related, exemplary method includes scanning and displaying barcodes with the augmented reality vision barcode scanning system in conjunction with a human visual system.

18 Claims, 3 Drawing Sheets

(51) Int. Cl.
  *G06Q 20/20* (2012.01)
  *G06K 7/10* (2006.01)
  *G02C 11/00* (2006.01)
  *G09G 5/00* (2006.01)

(52) U.S. Cl.
  CPC .......... *G02C 11/10* (2013.01); *G06K 7/10831* (2013.01); *G06Q 20/202* (2013.01); *G06Q 20/203* (2013.01); *G06Q 20/208* (2013.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 6,832,725 | B2 | 12/2004 | Gardiner et al. |
| 7,128,266 | B2 | 10/2006 | Marlton et al. |
| 7,159,783 | B2 | 1/2007 | Walczyk et al. |
| 7,397,607 | B2* | 7/2008 | Travers ............ G02B 27/0172 359/629 |
| 7,413,127 | B2 | 8/2008 | Ehrhart et al. |
| 7,726,575 | B2 | 6/2010 | Wang et al. |
| 8,142,016 | B2* | 3/2012 | Legerton .......... B29D 11/00048 264/1.32 |
| 8,184,069 | B1* | 5/2012 | Rhodes ................ G02B 27/017 345/8 |
| 8,228,315 | B1* | 7/2012 | Starner ............... G02B 27/017 345/175 |
| 8,294,969 | B2 | 10/2012 | Plesko |
| 8,317,105 | B2 | 11/2012 | Kotlarsky et al. |
| 8,322,622 | B2 | 12/2012 | Suzhou et al. |
| 8,366,005 | B2 | 2/2013 | Kotlarsky et al. |
| 8,371,507 | B2 | 2/2013 | Haggerty et al. |
| 8,376,233 | B2 | 2/2013 | Van Horn et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Horn et al. |
| 8,408,469 | B2 | 4/2013 | Good |
| 8,424,768 | B2 | 4/2013 | Rueblinger et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,482,858 | B2* | 7/2013 | Sprague ............. G02B 27/0172 359/630 |
| 8,490,877 | B2 | 7/2013 | Kearney |
| 8,517,271 | B2 | 8/2013 | Kotlarsky et al. |
| 8,520,309 | B2* | 8/2013 | Sprague ............. G02B 27/286 359/630 |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van Horn et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein |
| 8,561,905 | B2 | 10/2013 | Edmonds et al. |
| 8,565,107 | B2 | 10/2013 | Pease et al. |
| 8,571,307 | B2 | 10/2013 | Li et al. |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre |
| D702,237 | S | 4/2014 | Oberpriller et al. |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,740,082 | B2 | 6/2014 | Wilz |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,736,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van Horn et al. |
| 8,820,630 | B2 | 9/2014 | Qu et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| 8,849,019 | B2 | 9/2014 | Li et al. |

(56) References Cited

U.S. PATENT DOCUMENTS

| | | |
|---|---|---|
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,111,473 B1* | 8/2015 | Ho .................. G02B 1/043 |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,679,126 B2* | 6/2017 | Warrier .............. G06F 21/32 |
| 9,767,720 B2* | 9/2017 | Kinnebrew .......... G09G 3/003 |
| 2002/0101568 A1* | 8/2002 | Eberl ............... G02B 27/017 351/211 |
| 2005/0195128 A1* | 9/2005 | Sefton .............. A63B 71/0622 345/7 |
| 2007/0063048 A1 | 3/2007 | Havens et al. |
| 2009/0134221 A1 | 5/2009 | Zhu et al. |
| 2009/0189830 A1* | 7/2009 | Deering ................. G09G 3/02 345/1.3 |
| 2010/0045869 A1* | 2/2010 | Baseley ................ G06T 19/00 348/598 |
| 2010/0103077 A1* | 4/2010 | Sugiyama ........... G02B 27/017 345/8 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2011/0007277 A1* | 1/2011 | Solomon ............ G02B 26/105 353/7 |
| 2011/0158478 A1 | 6/2011 | Yamada et al. |
| 2011/0169999 A1 | 7/2011 | Grunow et al. |
| 2011/0202554 A1 | 8/2011 | Powilleit et al. |
| 2011/0241976 A1* | 10/2011 | Boger ............... G02B 27/0172 345/8 |
| 2011/0260967 A1* | 10/2011 | Matsushima .......... G02B 7/002 345/156 |
| 2012/0075168 A1* | 3/2012 | Osterhout ........... G02B 27/017 345/8 |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0194418 A1* | 8/2012 | Osterhout .......... G02B 27/0093 345/156 |
| 2012/0194419 A1* | 8/2012 | Osterhout .......... G02B 27/0093 345/156 |
| 2012/0194420 A1* | 8/2012 | Osterhout .......... G02B 27/0093 345/156 |
| 2012/0194549 A1* | 8/2012 | Osterhout .......... G02B 27/0093 345/633 |
| 2012/0203647 A1 | 8/2012 | Smith |
| 2012/0212399 A1* | 8/2012 | Border ............... G02B 27/017 345/8 |
| 2012/0223141 A1 | 9/2012 | Good et al. |
| 2012/0281181 A1* | 11/2012 | Chen .................... G02C 7/04 351/159.03 |

(56) References Cited

U.S. PATENT DOCUMENTS

| | | |
|---|---|---|
| 2013/0016070 A1* | 1/2013 | Starner ............... G02B 27/017 345/175 |
| 2013/0043312 A1 | 2/2013 | Van Horn |
| 2013/0075168 A1 | 3/2013 | Amundsen et al. |
| 2013/0127980 A1* | 5/2013 | Haddick ............... G06F 3/013 348/14.08 |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Corcoran |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Li et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0121438 A1 | 5/2014 | Kearney |
| 2014/0121445 A1 | 5/2014 | Ding et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131441 A1 | 5/2014 | Nahill et al. |
| 2014/0131443 A1 | 5/2014 | Smith |
| 2014/0131444 A1 | 5/2014 | Wang |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0211146 A1* | 7/2014 | Gupta ............... G02B 3/12 351/158 |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0285429 A1* | 9/2014 | Simmons ............... G02B 27/225 345/156 |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071818 A1 | 3/2015 | Todeschini |
| 2015/0083800 A1 | 3/2015 | Li et al. |
| 2015/0086114 A1 | 3/2015 | Todeschini |

(56) References Cited

U.S. PATENT DOCUMENTS

| | | |
|---|---|---|
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0186703 A1 | 7/2015 | Chen et al. |
| 2015/0192774 A1 | 7/2015 | Watanabe et al. |
| 2015/0193644 A1 | 7/2015 | Keamey et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2013173985 A1 | 11/2013 |
| WO | 2014002686 A1 | 1/2014 |
| WO | 2014019130 A1 | 2/2014 |
| WO | 2014110495 A1 | 7/2014 |

OTHER PUBLICATIONS https://www.cnet.com/news/augmented-reality-contact-lenses-to-be-human-ready-at-ces/ (Year: 2014).*
European extended Search Report in related EP Application No. 15200914.1, dated Jun. 20, 2016, 7 pages.
KNAPP AG: "KNAPP AG—KiSoft Vision", Dec. 7, 2011, 4 pages [Retrieved from Internet: URL:https://www.youtube.com/watch?v=BWY8uF1teIM on Apr. 25, 2016].
U.S. Appl. No. 14/715,916 for Evaluating Image Values filed May 19, 2015 (Ackley); 60 pages.
U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 44 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

* cited by examiner

AUGMENTED REALITY VISION BARCODE SCANNING SYSTEM AND METHOD

CROSS-REFERENCE TO PRIORITY APPLICATION

This U.S. nonprovisional application hereby claims the benefit of U.S. patent application Ser. No. 62/098,150 for Augmented Reality Vision Barcode Scanning System and Method (filed Dec. 30, 2014), which is hereby incorporated by reference in its entirety

FIELD OF THE INVENTION

The present invention relates to augmented reality vision systems and barcode scanning systems.

BACKGROUND

Current barcode scanning generally requires point of sale (POS) attendants to use handheld or embedded check-stand equipment. The current equipment limits POS attendant's mobility and efficiency, but such limits are necessary to link barcode scanning at POS with inventory control and other business needs.

There have been many advance in recent years in augmented reality vision systems, such as U.S. Pat. No. 8,482,858, which is incorporated herein by reference and which teaches in one embodiment: a contact lens assembly comprising a substrate including optical path optics and configured to receive a display information optical path emitted from a display and a non-display information optical path not emitted from the display. The optical path optics of the substrate is configured to be partially deflective such that the non-display information optical path is transmitted to a human visual system without deflection, and the display information optical path is transmitted to the human visual system with deflection. Therefore, a virtual or display image can be viewed by the human visual system at the same time or superimposed on the normal vision.

Development and advances in virtual reality eyewear are progressing. See for example U.S. Pat. No. 8,228,315 and 2011/0260967. Eyewear can have micro-projectors, cameras, wireless communication links, tethers to smartphones, and the like.

Nonetheless, a need exists to replace check-stand mounted and embedded barcode scanning equipment with an advanced system with augmented reality vision eyewear which can communicate with remote decoders and customer interface. Such a system, not found in the art, would enhance POS operator work, technical capability, and efficiency, and open new possibilities in retail and inventory and source control.

SUMMARY

Accordingly, in one aspect, the present invention embraces an augmented reality vision barcode scanning system for use with a human visual system including three main components: at least one scanning contact lens, wireless enabled companion eyewear, and a remote barcode decoder.

In an exemplary embodiment, an augmented reality vision barcode scanning system in conjunction with a human visual system includes at least one contact lens coated with a reflective surface over a portion of the contact lens that corresponds to the outer edges of the pupil of the eye of the human visual system and the iris portion of the eye of the human visual system (e.g., a person's pupil and iris). The reflective surface is configured to pass a portion of ambient light and to deflect near-surface images. The contact lens has a clear aperture corresponding to the center portion of the pupil of the human visual system.

The exemplary embodiment also includes eyewear. The eyewear has at least one semi-transparent, semi-reflective surface that is viewable to the human visual system. The eyewear has at least one imager for receiving reflective images from the contact lens. The eyewear is wireless-communication enabled. The eyewear also has a micro-projector for projecting images onto the viewable surfaces. The eyewear is further provided with an aiming function. The eyewear has means configured to communicatively couple the imager, the wireless communication, the micro-projector, and the aiming function.

Further, the augmented reality barcode scanning vision system includes a remote barcode decoder. The barcode decoder is enabled for wireless communication, especially pertaining to barcodes to be decoded and the resulting decoded information. For the system in operation, the aiming function is configured to identify a barcode image to be scanned. The contact lens is configured to reflect a barcode image viewed by the human visual system via the reflective surface to the imager. The eyewear is configured to transmit the barcode image received by the imager to the barcode decoder via the wireless communications enablement. The barcode decoder is configured to decode the barcode received from the eyewear and to send the decoded barcode information to the eyewear. The eyewear is further configured to display the decoded barcode information on the viewable surface via the micro-projector. The contact lens is configured to allow the decoded barcode information on the viewable surface to pass through the clear aperture to the human visual system and to be deflected by the reflective surface. Therefore, the decoded barcode information and ambient light are simultaneously viewable by the human visual system.

In another exemplary embodiment of the augmented reality vision barcode scanning system, the contact lens is a prescription contact lens.

In another exemplary, the contact lens is a pair of contact lenses.

In yet another exemplary embodiment of the augmented reality vision barcode scanning system, the eyewear is provided with a reflective surface configured to receive the barcode image from the reflective surface of the contact lens and to reflect the barcode image to the imager.

In another exemplary embodiment of the augmented reality vision barcode scanning system, the eyewear is provided with wireless enabled ear buds. The ear buds are configured to receive decoded barcode information from the barcode decoder.

In another exemplary embodiment of the augmented reality vision barcode scanning system, the viewable surface has a first portion and a second portion. The micro-projector is configured to display the decoded barcode information on the first portion of the viewable surface. The second portion of the viewable surface is configured to pass ambient light to the human visual system so the human visual system views the decoded barcode information superimposed on ambient light.

In another exemplary embodiment of the augmented reality vision barcode scanning system, the viewable surface is a two-section surface corresponding to the two eyes of the typical human visual system (i.e., binocular vision).

In yet another exemplary embodiment of the augmented reality vision barcode scanning system, the system further includes one or more wireless enabled point-of-sale modules and one or more wireless enabled inventory-control modules.

In another exemplary embodiment of the augmented reality vision barcode scanning system, the barcode decoder is configured to send decoded barcode information to the point-of-sale modules and to the inventory-control modules.

In yet another exemplary embodiment of the augmented reality vision barcode scanning system, the aiming function includes an LED mounted on the eyewear. The aiming function is configured to communicate to the imager that the barcode image being illuminated by the LED is the barcode image to be scanned.

In another exemplary embodiment of the augmented reality vision barcode scanning system, the scanning system is configured to be initialized by an act of the wearer of the system.

In another exemplary embodiment of the augmented reality vision barcode scanning system, the eyewear is provided with a microphone and voice recognition software. The microphone is communicatively coupled to the imager, the wireless communications, the micro-projector, and the aiming function. The act to initialize the scanning system can be a voice command by the wearer of the augmented reality vision barcode scanning system.

In still another exemplary embodiment of the augmented reality vision barcode scanning system, the eyewear is provided with a user-activated switch to initialize the scanning system.

In another aspect, the present invention embraces a method of scanning and displaying barcode information with an augmented reality vision barcode scanning system for use in conjunction with a human visual system.

In an exemplary embodiment of the method of scanning and displaying barcode information with an augmented reality vision barcode scanning system, the augmented reality vision barcode system includes at least one contact lens coated with a reflective surface over a portion of the contact lens that corresponds to the outer edges of the pupil of the eye of the human visual system and the iris portion of the eye of the human visual system (e.g., a person's pupil and iris). The reflective surface is configured to pass a portion of ambient light and to deflect near-surface images. The contact lens has a clear aperture for the center portion of the pupil of the human visual system. The augmented reality vision barcode system also is provided with eyewear. The eyewear has at least one semi-transparent, semi-reflective surface viewable by the human visual system. The eyewear has an imager for receiving reflective images from the contact lens and is wireless-communication enabled. The eyewear further has a micro-projector for projecting images onto the viewable surfaces. The eyewear has means configured to communicatively couple the imager, the wireless communications, and the micro-projector. Finally, the augmented reality vision system barcode scanning system has a remote barcode decoder. The barcode decoder is wireless enabled, especially pertaining to barcodes to be decoded and decoded information.

The method of decoding and displaying barcode information includes the following of: (i) viewing a barcode by the human visual system; (ii) initializing the scanning system; (iii) identifying the barcode to be scanned via the aiming function; (iv) reflecting the barcode image by the reflective surface of the contact lens to the imager on the eyewear; (v) transmitting the barcode image to a barcode decoder via the eyewear wireless communication; (vi) decoding the barcode; (vii) sending the decoded barcode information to the eyewear; (viii) displaying the decoded barcode information on the viewable surfaces via the micro-projector; (ix) reflecting the displayed decoded barcode information through the clear aperture to the human visual system; (x) deflecting the displayed decoded barcode information from entering the human visual system at the reflective surface of the contact lens; and (xi) passing ambient light through the reflective surface of the contact lens to the human visual system.

In another exemplary embodiment of the method of scanning and displaying barcode information with an augmented reality vision barcode scanning system, the eyewear is provided with wireless enabled ear buds, and the method further includes receiving audio decoded barcode information from the barcode decoder.

In another exemplary embodiment of the method of scanning and displaying barcode information with an augmented reality vision barcode scanning system, the eyewear is provided with a reflective surface for reflecting images from the reflective surface of the contact lens to the imager, and the first reflecting step includes receiving the barcode image from the reflective surface of the contact lens on the eyewear reflective surface and reflecting the barcode image from the eyewear reflective surface to the imager.

In yet another exemplary embodiment of the method of scanning and displaying barcode information with an augmented reality vision barcode scanning system, the system further includes point-of-sale modules being wireless enabled and inventory-control modules being wireless enabled. The method further includes sending decoded barcode information to point-of-sale modules and to inventory-control modules.

In still another exemplary embodiment of the method of scanning and displaying barcode information with an augmented reality vision barcode scanning system, the system further includes a microphone and voice recognition software. The microphone and voice recognition software are communicatively linked to the system. The initializing step is accomplished by a user of the system issuing a voice command.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
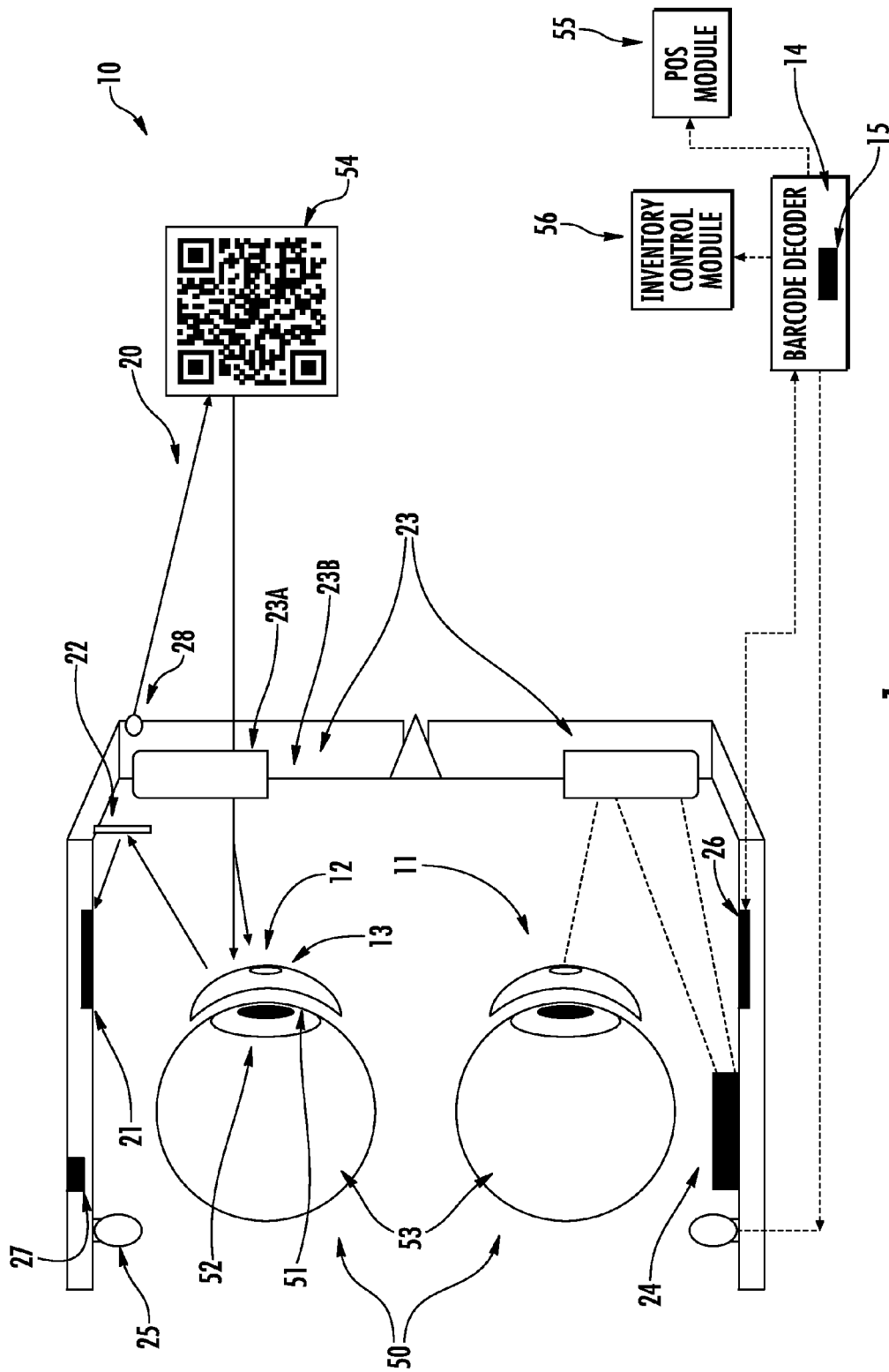
FIG. 1 schematically depicts an exemplary embodiment of an augmented reality vision barcode scanning system for use in conjunction with a human visual system according to the present invention.

The present invention embraces an augmented reality barcode scanning vision system and a method of decoding and displaying a barcode with an augmented reality barcode scanning vision system.

The present invention will now be described more fully hereinafter with reference to the accompanying drawings in which exemplary embodiments of the invention are shown. This invention however may be embodied in many different forms and should not be construed as limited to the embodiments set forth herein. In the drawings, like numbers refer to like elements throughout.

Referring now to FIG. 1, in an exemplary embodiment of the present invention, an augmented reality barcode scanning vision system 10 is illustrated. The augmented reality barcode scanning vision system is used in conjunction with a human visual system 50 whose main components for purpose of this description are the iris 51 and the pupil 52.

The augmented reality barcoded scanning vision system 10 includes three primary components: a contact lens system 11, eyewear 20, and a barcode decoder 14. The contact lens 11 can be a prescription contact lens, and accordingly a pair of contact lenses 11 can be prescription contact lenses. The contact lenses 11 are provided with a clear aperture 12 corresponding to the center portion of the pupil 52 of the human visual system 50. The contact lenses 11 are also provided with a reflective surface 13 corresponding to the outer portion of the pupil 52 and the iris 51 portion of the human visual system 50. The reflective surface 13 deflects near-surface images and passes at least a portion of ambient light.

The contact lenses 11 may be similar to those described in U.S. Pat. No. 8,482,858 or be similar to augmented reality vision contact lenses marketed as iOptik™ available from Innovega of Bellevue, Wash., USA. The iOPtik™ lenses, besides reflecting and passing different portions of ambient and near-surface light for example, are further enabled with optics and filters embedded into standard contact lenses. The contact lenses allow a human visual system the ability to focus on micro-displays that are placed within proximity (near surface images) to the human visual system, which are usually not focusable by the human visual system because of their proximity. The optics in the contact lens magnify the tiny image found on the micro-display and transform it into a large one. Because the focusing optics are found within the contact lens, resolution and image size is not affected regardless of how small or thin the micro-display is. In some instances the contact lenses 11 may be provided with other features (not shown) such as embedded circuitry, LEDs, tiny antennae, and special circuits would work together to display information for the human visual system 50.

The eyewear 20 has at least one semi-transparent, semi-reflective surface 23 viewable to the human visual system 50. The eyewear 20 is provided with an imager 21 for receiving reflective images from the contact lens 11. The eyewear 20 is enabled for wireless communications 26. The eyewear 20 is further provided with a micro-projector 24 for projecting images onto the viewable surfaces 23. The eyewear has an aiming function 28. The aiming function at least partially includes an LED that can pointed to a barcode 54 to be scanned. The eyewear 20 is also provided with means 27 configured to communicatively couple the imager 21, the wireless communications 26, the micro-projector 24 and the aiming function. The means 27 configured to communicatively couple the imager 21, the wireless communications 26, and the micro-projector 24 may be an operating system, a processor, a wireless communications system between the components, an onboard computing system, or the like. There may be hardwire connections between components or wireless links, or a combination thereof. The aiming function 28 is configured to communicate to the imager 21 that the barcode image 54 being illuminated by the aiming function 28 is the barcode image 54 to be scanned.

The eyewear 20 is patterned after smart glasses and active vision glasses as known in the art. Exemplary eyewear is described in U.S. Pat. No. 8,228,315, which is incorporated herein by reference, is provided with, among other features, a display, projector, camera, onboard computing system. Innovega, provider of iOptik™ contact lens as discussed previously is also a provider of eyewear configured to be used with the iOptik™ contact lens. This eyewear is provided with an imager, micro-projector, earbuds, and viewable surfaces. The Innovega eyewear is particularly suited for the present augmented reality barcode scanning vision system. The Innovega eyewear or similar eyewear can be modified for wireless enablement (if not already provided) and for collecting images reflected off the reflective portion of a contact lens.

The augmented reality vision barcode scanning system 10 can optionally include a microphone (not shown) and voice recognition software (not shown). The microphone may be incorporated into the eyewear 20 as may be the voice recognition software. The augmented reality vision barcode scanning system 10 may be initialized by a user's voice command into the microphone. The voice recognition software is programmed to recognized commands such as "aim," and "scan." The microphone and voice recognition software are communicatively coupled to the other components of the barcode scanning system.

Alternatively, the augmented reality vision barcode scanning system 10 may be initialized by another act of the user. For example, the eyewear 20 may be provided with a user-activated switch (not shown) that initializes the scanning system.

The remote barcode decoder 14 is wireless enabled 15 to send and receive information pertaining to barcodes to be decoded and the resulting decoded information. The barcode decoder 14 may also send and receive other information. The barcode decoder 14 may be a dedicated barcode device or could be another device with barcode decoding software installed thereon. For example, the barcode decoder 14 could be a smartphone, a tablet, or another computing device with decoding software.

The contact lens 11, the eyewear 20, and the barcode decoder 14 of the augmented reality vision barcode scanning system 10 are configured to work together. The aiming function 28 is configured to illuminate the barcode image 54 and communicate to the imager 21 that the illuminated barcode image 54 is the image to be scanned. The contact lens 11 is configured to reflect a barcode image 54 viewed by the human visual system 50 via the reflective surface 13 to the imager 21. The eyewear 20 is configured to transmit the barcode image 54 received by the imager 21 to the barcode decoder 15 via the eyewear 20 wireless communications 26. The barcode decoder 15 is configured to decode the barcode received from the eyewear 20 and to send the decoded barcode information to the eyewear 20. The eyewear 20 is configured to display the decoded barcode information on the viewable surfaces 23 via the micro-projector 24. The contact lens 11 is configured to allow the decoded barcode information on the viewable surface 23 to pass through the clear aperture 12 to the human visual system 50 and to be deflected by the reflective surface 13, whereby, the decoded barcode information and ambient light are simultaneously viewable by the human visual system 50.

In an exemplary embodiment, the contact lens 11 is a prescription contact lens.

In another exemplary embodiment, the contact lens 11 is a pair of contact lenses 11.

In yet another exemplary embodiment, the eyewear 20 is provided with a reflective surface 22 configured to receive the barcode image 54 from the reflective surface 13 of the contact lens 11 and to reflect the barcode image 54 to the imager 21.

In still another exemplary embodiment, the eyewear 20 is provided with wireless-enabled ear buds 25. The ear buds are configured to receive decoded barcode information from the barcode decoder 15.

In another exemplary embodiment, the viewable surface 23 is a two-section surface corresponding to the two eyes 53 of the human visual system 50 (i.e., binocular vision)

In yet another exemplary embodiment, the viewable surface has a first portion 23A and a second portion 23B. The micro-projector 24 is configured to display the decoded barcode information on the first portion 23A of the viewable surface 23. The second portion 23B of the viewable surface 23 is configured to pass ambient light to the human visual system 50, whereby the human visual system 50 views the decoded barcode information superimposed on ambient light.

In another exemplary embodiment, the augmented reality vision barcode scanning system 10 is further provided with at least one wireless enabled point-of-sale module 55 and at least one wireless enabled inventory-control module 56. The barcode decoder 15 is configured to send decoded barcode information to the point-of-sale module 55 and to the inventory-control module 56.

In the FIG. 1, the cooperation between components is illustrated. The barcode 54 is viewed by the human visual system 50 through the view surfaces 23 of the eyewear 20. The aiming function LED 28 illuminates the barcode image 54. The barcode 50 image is reflected off the reflective surface 13 of the contact lens 11 and to the reflector 22 of the eyewear 20. The reflector 22 reflects the barcode image 50 to the imager 21. The imager 21 sends the barcode image 50 via wireless communication 26 to the barcode decoder 14. The barcode decoder 14 decodes the barcode and sends the decoded information back to the eyewear 20, and optionally to POS modules 55, inventory-control modules 56, and/or wireless enabled earbuds 25 on the eyewear 20, too. The eyewear 20 receives the decoded information. The eyewear is provided with means 27 that communicatively link the various components of the eyewear 20. The decoded information is linked to the micro-projector 24 and displayed on the view surfaces 23, and more particularly on the first portion 23A of the view surfaces 23. The human visual system 50 views the decoded information displayed on the first portion 23A of the viewable surface 23 through the clear aperture 12 of the contact lens 11, and simultaneously views ambient light or has normal vision coming through the second portion 23B of the viewable surface 23 and incident on and passing through the reflective surface 13 of the contact lens 11. Thus, the decoded information is superimposed on the normal vision of the human visual system 50.

Besides the exemplary embodiments described, the augmented reality vision barcode scanning system 10 may benefit from a keypad for data entry and a good scan annunciator by the human using the system 10. In this way, the system 10 enhances the POS operator work description, technical capability, and opens new possibilities in retail, inventory, and source control experience. In addition, the system 10 can be used by consumers to comparatively shop by having barcode information at their fingertips. Finally, factory inventory control can be simplified and streamlined by the system 10.

Figure 2:
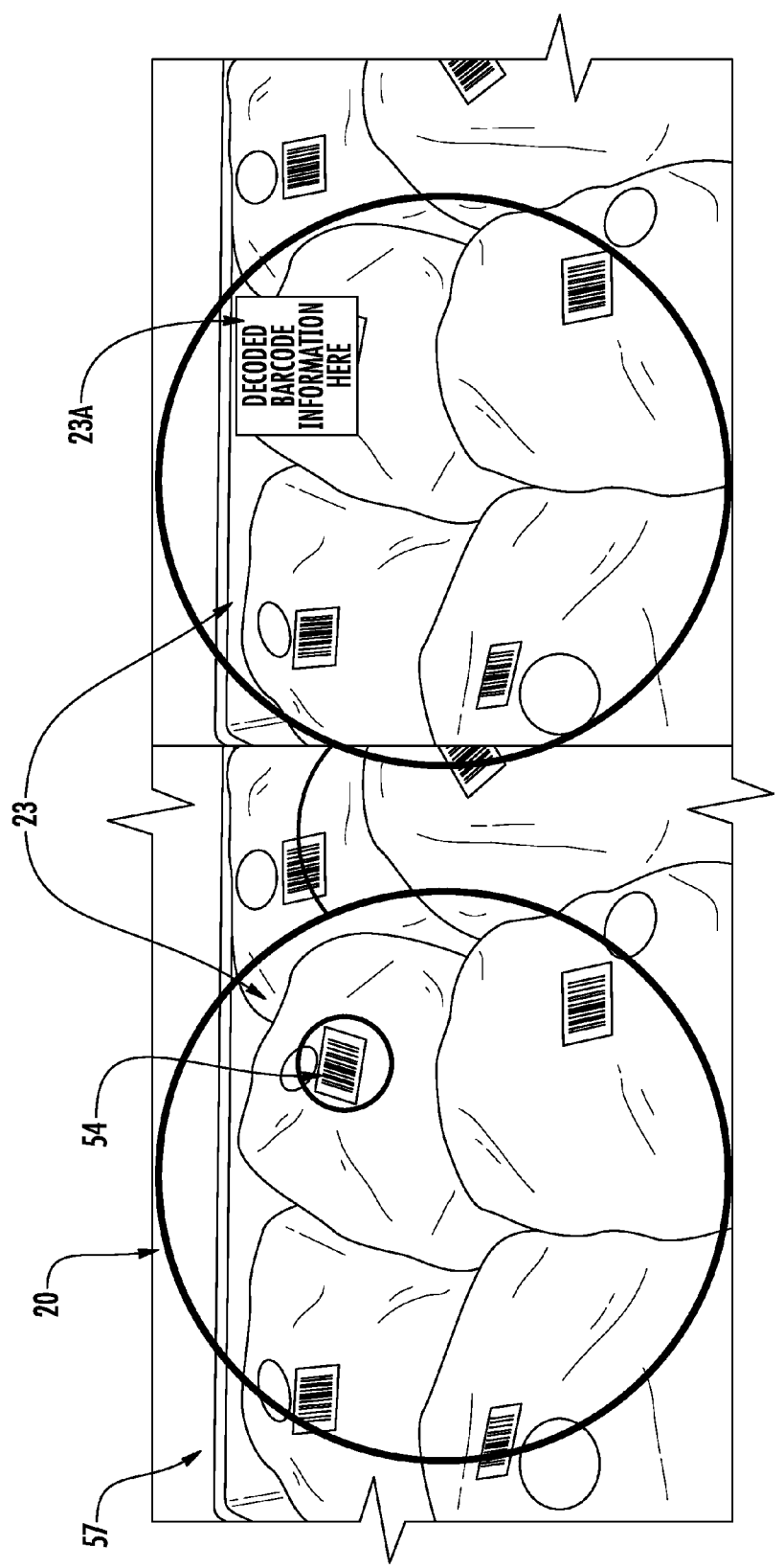
FIG. 2 schematically depicts the exemplary embodiment of the augmented reality vision barcode scanning system of FIG. 1 from the perspective of the human visual system.

Referring now to FIG. 2 in conjunction with FIG. 1, portions of the augmented reality vision barcode scanning system 10 of FIG. 1 are shown in more detail. In particular, FIG. 2 illustrates what the human visual system 50 might see while using the augmented reality vision barcode scanning system 10. The viewable surfaces 23 of the eyewear 20 are shown. Ambient images 57 of products containing barcodes are viewed through the viewable surfaces. The barcode 54, is identified as the barcode to be scanned. After the barcode 54 is scanned and decoded as described in conjunction with FIG. 1, the decoded information is displayed on the first portion 23A of the viewable surfaces 23, so that both the ambient images 57 and the decoded information on the first portion 23A of the viewable surface 23 can be viewed simultaneously by the human visual system.

Figure 3:
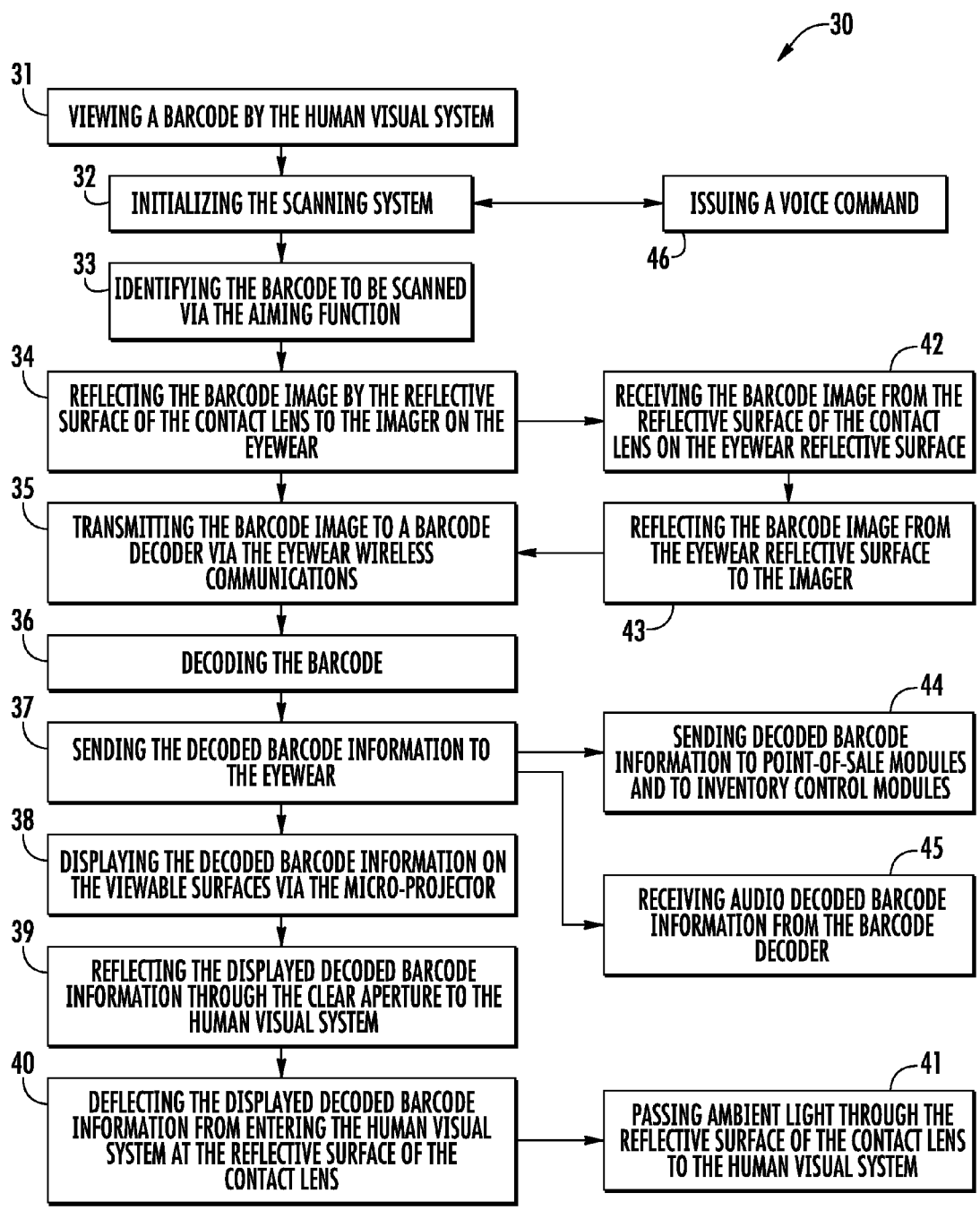
FIG. 3 depicts a flowchart of an exemplary embodiment of a method of scanning and displaying barcode information with an augmented reality vision barcode scanning system according to the present invention.

As discussed previously, the present invention also embraces a method of scanning and displaying barcodes with an augmented reality vision barcode scanning system for use in conjunction with a human visual system. Referring now to FIG. 3, the method 30 in an exemplary embodiment is illustrated in a flowchart. The augmented reality vision barcode scanning system used with the method 30 is as described previously in conjunction with FIG. 1. That is, the augmented reality vision barcode scanning system generally includes three components. The first component is at least one contact lens coated with a reflective surface over a portion of the contact lens that corresponds to the outer edges of the pupil of the eye of the human visual system and the iris portion of the eye of the human visual system. The contact lens has a clear aperture for the center portion of the pupil of the human visual system. The reflective surface is configured to pass a portion of ambient light and to deflect near-surface images. The second component is wireless enabled eyewear. The eyewear has at least one semi-transparent, semi-reflective surface viewable to the human visual system. The eyewear also has an imager for receiving reflective images from the contact lens. The eyewear further has a micro-projector for projecting images onto the viewable surfaces. The eyewear is provided with means configured to communicatively couple the imager, the wireless communications, and the micro-projector. The third component is a wireless enabled remote barcode decoder.

The method 30 includes the following exemplary steps: viewing a barcode by the human visual system 31; initializing the scanning system 32; identifying the barcode to be scanned via the aiming function 33; reflecting the barcode image by the reflective surface of the contact lens to the imager on the eyewear 34; transmitting the barcode image to a barcode decoder via the eyewear wireless communications 35; decoding the barcode at the remote barcode decoder 36; sending the decoded barcode information to the eyewear, via wireless link 37; displaying the decoded barcode information on the viewable surfaces via the micro-projector 38; reflecting the displayed decoded barcode information through the clear aperture to the human visual system 39; deflecting the displayed decoded barcode information from entering the human visual system at the reflective surface of the contact lens 40; and passing ambient light through the reflective surface of the contact lens to the human visual system 41.

In another exemplary embodiment of the method 30, the eyewear is provided with wireless enable earbuds, and the method 30 includes the additional step of receiving audio decoded barcode information from the barcode decoder 45.

In another exemplary embodiment of the method 30, the eyewear is provided with a reflective surface for reflecting images from the reflective surface of the contact lens to the imager. The reflecting step 34 includes the following exemplary steps: receiving the barcode image from the reflective surface of the contact lens on the eyewear reflective surface 42, and reflecting the barcode image from the eyewear reflective surface to the imager 43.

In yet another exemplary embodiment of the method 30, the system includes wireless enabled point-of-sale modules and wireless enabled inventory-control modules. The method 30 further includes the step of sending decoded barcode information to point-of-sale modules and to inventory-control modules 44.

In another exemplary embodiment of the method 30, the system includes a microphone and voice recognition software. The microphone and voice recognition software are communicatively linked to the system. The initializing step 32 is accomplished by a user of the system issuing a voice command 46.

To supplement the present disclosure, this application incorporates entirely by reference the following patents, patent application publications, and patent applications:
U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;

International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;

U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An augmented reality vision barcode scanning system for use in conjunction with a human visual system, comprising:
   (i) at least one contact lens coated with a reflective surface over a portion of the contact lens that corresponds to the outer edges of the pupil of the eye of the human visual system and the iris portion of the eye of the human visual system, the contact lens having a clear aperture for the center portion of the pupil of the human visual system, the reflective surface configured to pass a portion of ambient light and to deflect near-surface images;
   (ii) eyewear having at least one semi-transparent, semi-reflective surface viewable to the human visual system, the eyewear having an imager for receiving reflective images from the contact lens, the eyewear being enabled for wireless communication, the eyewear having a micro-projector for projecting images onto the viewable surfaces, the eyewear being provided with an aiming function, the eyewear having means configured to communicatively couple the imager, the wireless communications, the micro-projector, and the aiming function;
   (iii) a remote barcode decoder, the barcode decoder being wireless enabled to send and receive information pertaining to barcodes to be decoded and decoded information;
   the aiming function configured to identify a barcode image to be scanned;
   the contact lens configured to reflect the barcode image viewed by the human visual system via the reflective surface to the imager;
   the eyewear configured to transmit the barcode image received by the imager to the barcode decoder via wireless communications;
   the barcode decoder configured to decode the barcode received from the eyewear and to send the decoded barcode information to the eyewear;
   the eyewear configured to display the decoded barcode information on the viewable surface via the micro-projector; and
   the contact lens configured to allow the decoded barcode information on the viewable surface to pass through the clear aperture to the human visual system and to be deflected by the reflective surface so that the decoded barcode information and ambient light are simultaneously viewable by the human visual system.

2. The augmented reality vision barcode scanning system of claim 1, wherein the contact lens is a prescription contact lens.

3. The augmented reality vision barcode scanning system of claim 1, wherein the contact lens is a pair of contact lenses.

4. The augmented reality vision barcode scanning system of claim 1, wherein the eyewear is provided with a reflective surface configured to receive the barcode image from the reflective surface of the contact lens and to reflect the barcode image to the imager.

5. The augmented reality vision barcode scanning system of claim 1, wherein the eyewear is provided with wireless enabled ear buds configured to receive decoded barcode information from the barcode decoder.

6. The augmented reality vision barcode scanning system of claim 1, wherein the viewable surface is a two-section surface corresponding to the two eyes of the human visual system.

7. The augmented reality vision barcode scanning system of claim 1, wherein the viewable surface has a first portion and a second portion, the micro-projector is configured to display the decoded barcode information on the first portion of the viewable surface, and the second portion of the viewable surface is configured to pass ambient light to the human visual system so the human visual system views the decoded barcode information superimposed on ambient light.

8. The augmented reality vision barcode scanning system of claim 1, comprising at least one wireless enabled point-of-sale module and at least one wireless enabled inventory-control module.

9. The augmented reality vision barcode scanning system of claim 8, wherein the barcode decoder is configured to send decoded barcode information to the point-of-sale module and to the inventory-control module.

10. The augmented reality vision barcode scanning system of claim 1, wherein the aiming function includes an LED mounted on the eyewear, and the aiming function is configured to communicate to the imager that the barcode image being illuminated by the LED is the barcode image to be scanned.

11. The augmented reality vision barcode scanning system of claim 1, wherein the scanning system is configured to be initialized by an act of the wearer of the system.

12. The augmented reality vision barcode scanning system of claim 11, wherein:
   the eyewear is provided with a microphone and voice recognition software;
   the microphone is communicatively coupled to the imager, the wireless communications, the micro-projector, and the aiming function; and
   the act to initialize the scanning system is a voice command by the wearer of the augmented reality vision barcode scanning system.

13. The augmented reality vision barcode scanning system of claim 11, wherein the eyewear is provided with a user-activated switch to initialize the scanning system.

14. A method of scanning and displaying barcode information with an augmented reality vision barcode scanning system for use in conjunction with a human visual system, comprising:
   i. providing an augmented reality vision barcode system having:
      at least one contact lens coated with a reflective surface over a portion of the contact lens that corresponds to the outer edges of the pupil of the eye of the human visual system and the iris portion of the eye of the human visual system, the contact lens having a clear aperture for the center portion of the pupil of the human visual system, the reflective surface configured to pass a portion of ambient light and to deflect near-surface images;
      eyewear having at least one semi-transparent, semi-reflective surface viewable to the human visual system, the eyewear having an imager for receiving reflective images from the contact lens, the eyewear being enabled for wireless communication, the eyewear having a micro-projector for projecting images onto the viewable surfaces, the eyewear being provided with an aiming function, the eyewear having means configured to communicatively couple the imager, the wireless communications, the micro-projector and the aiming function;
a remote barcode decoder, the barcode decoder being wireless enabled for sending and receiving information pertaining to barcodes to be decoded and decoded information;
ii. viewing a barcode by the human visual system;
iii. initializing the scanning system;
iv. identifying the barcode to be scanned via the aiming function;
v. reflecting the barcode image by the reflective surface of the contact lens to the imager on the eyewear;
vi. transmitting the barcode image to a barcode decoder via the eyewear wireless communications;
vii. decoding the barcode at the barcode decoder;
viii. sending the decoded barcode information to the eyewear;
ix. displaying the decoded barcode information on the viewable surfaces via the micro-projector;
x. reflecting the displayed decoded barcode information through the clear aperture to the human visual system;
xi. deflecting the displayed decoded barcode information from entering the human visual system at the reflective surface of the contact lens; and
xii. passing ambient light through the reflective surface of the contact lens to the human visual system.

15. The method of claim 14, wherein the eyewear is provided with wireless enabled ear buds, and comprising the further step of receiving audio decoded barcode information from the barcode decoder.

16. The method of claim 14, wherein:
the eyewear is provided with a reflective surface for reflecting images from the reflective surface of the contact lens to the imager; and
the reflecting step comprises receiving the barcode image from the reflective surface of the contact lens on the eyewear reflective surface and reflecting the barcode image from the eyewear reflective surface to the imager.

17. The method of claim 14, wherein the system comprises at least one wireless enabled point-of-sale module and at least one wireless enabled inventory-control module, the method further comprising the step of sending decoded barcode information to the point-of-sale module and to the inventory-control module.

18. The method of claim 14, wherein the system comprises a microphone and voice recognition software, the microphone and voice recognition software being communicatively linked to the system, and wherein the initializing step is accomplished by a user of the system issuing a voice command.

* * * * *